US012792615B2

(12) United States Patent
Jin et al.

(10) Patent No.: US 12,792,615 B2
(45) Date of Patent: Nov. 10, 2026

(54) VECTOR RETRIEVAL METHODS AND APPARATUSES, DEVICES, AND STORAGE MEDIA

(71) Applicant: Alipay (Hangzhou) Information Technology Co., Ltd., Hangzhou (CN)

(72) Inventors: Jiabao Jin, Hangzhou (CN); Xiangyu Wang, Hangzhou (CN); Xiaoyao Zhong, Hangzhou (CN); Zhitao Shen, Hangzhou (CN); Wei Jia, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/979,200

(22) Filed: Dec. 12, 2024

(65) Prior Publication Data

US 2026/0030252 A1 Jan. 29, 2026

(30) Foreign Application Priority Data

Jul. 25, 2024 (CN) ......................... 202411013010.9

(51) Int. Cl.
*G06F 16/2457* (2019.01)
*G06F 16/22* (2019.01)
*G06F 16/901* (2019.01)

(52) U.S. Cl.
CPC .... *G06F 16/24578* (2019.01); *G06F 16/2237* (2019.01); *G06F 16/9024* (2019.01)

(58) Field of Classification Search
CPC ........... G06F 16/24578; G06F 16/2237; G06F 16/9024

(Continued)

(56) References Cited

U.S. PATENT DOCUMENTS 11,227,013 B2 * 1/2022 Leskovec ............ G06F 18/2148
11,423,082 B2 * 8/2022 Vikhe ............... G06F 16/24578

(Continued)

FOREIGN PATENT DOCUMENTS

CN 115129949 A 9/2022
WO 2024065692 A1 4/2024

OTHER PUBLICATIONS

Extended European Search Report in European Appln. No. 24220004.6, mailed on Apr. 28, 2025, 12 pages.

(Continued)

*Primary Examiner* — Miranda Le
(74) *Attorney, Agent, or Firm* — Fish & Richardson P.C.

(57) ABSTRACT

A computer-implemented method for vector retrieval includes, in response to a query vector, obtaining, from a first-level storage resource, at least one target compression vector having a highest similarity with the query vector based on a graph index constructed based on an original vector and a compression vector. After obtaining the at least one target compression vector, obtaining, from a second-level storage resource, at least one target original vector corresponding to the at least one target compression vector. Separately, a similarity between the query vector and the at least one target original vector is calculated; the at least one target original vector is sorted based on the calculated similarity; and, based on the sorted at least one target original vector, a vector retrieval result corresponding to the query vector is determined.

18 Claims, 3 Drawing Sheets

(58) Field of Classification Search
USPC .......................................................... 707/728
See application file for complete search history.

(56) References Cited

U.S. PATENT DOCUMENTS

| | | | | |
|---|---|---|---|---|
| 11,960,514 | B1 * | 4/2024 | Taylert | G06F 16/3329 |
| 12,079,185 | B2 * | 9/2024 | Misiewicz | G06F 16/3347 |
| 12,248,487 | B2 * | 3/2025 | Pishe | G06F 16/2246 |
| 2014/0324864 | A1 * | 10/2014 | Choe | G06F 16/73 707/737 |
| 2017/0185602 | A1 * | 6/2017 | Gusev | G06F 16/951 |
| 2018/0260472 | A1 * | 9/2018 | Kelsey | G06F 40/56 |
| 2019/0325531 | A1 * | 10/2019 | Walker | G06F 16/9535 |
| 2020/0233893 | A1 * | 7/2020 | He | G06F 16/435 |
| 2020/0311077 | A1 * | 10/2020 | Zhang | G06F 3/068 |
| 2020/0311542 | A1 * | 10/2020 | Wang | G06F 16/245 |
| 2021/0056150 | A1 * | 2/2021 | Karandish | G06N 3/04 |
| 2022/0179897 | A1 * | 6/2022 | Liu | G06F 16/432 |
| 2022/0335501 | A1 * | 10/2022 | Pande | G06F 16/9535 |
| 2023/0177089 | A1 * | 6/2023 | Zhai | G06F 16/9038 707/722 |
| 2023/0259458 | A1 * | 8/2023 | Appu | G06F 12/0868 345/557 |
| 2023/0351215 | A1 * | 11/2023 | Sun | G06N 5/022 |
| 2025/0053748 | A1 * | 2/2025 | Fayyaz | G06F 40/35 |
| 2025/0086215 | A1 * | 3/2025 | Kumar | G06F 16/345 |

OTHER PUBLICATIONS

Zhang et al., "Grip: Multi-Store Capacity-Optimized High-Performance Nearest Neighbor Search for Vector Search Engine," Paper, Presented at the Proceedings of the 28th ACM International Conference on Information and Knowledge Management (CIKM' 19), Beijing, China, Nov. 3-7, 2019; ACM, Nov. 3, 2019, pp. 1673-1682.

Zhang et al., "Zoom: SSD-based Vector Search for Optimizing Accuracy, Latency and Memory," CoRR, Submitted on Sep. 11, 2018, arXiv:1809.04067v1, 14 pages.

* cited by examiner

VECTOR RETRIEVAL METHODS AND APPARATUSES, DEVICES, AND STORAGE MEDIA

CROSS-REFERENCE TO RELATED APPLICATIONS

This application claims priority to Chinese Patent Application No. 202411013010.9, filed on Jul. 25, 2024, which is hereby incorporated by reference in its entirety.

TECHNICAL FIELD

One or more embodiments of this application relate to the field of database technologies, and in particular, to vector retrieval methods and apparatuses, devices, and storage media.

BACKGROUND

Vector retrieval is a technology for searching a high-dimensional space for a vector that is most similar to a given query vector. This technology is used in many fields, including but not limited to computer vision, natural language processing, recommendation systems, and information retrieval. In vector retrieval, data are typically represented as multidimensional vectors that exist in a multidimensional space, each dimension can represent one feature, and then similarity measurement is performed on these vectors to find the most similar vectors. The objective of vector retrieval is to find a group of vectors in a large vector database that are most similar to a query vector.

Shared storage is a storage resource shared between multiple computers. This storage mode allows multiple servers or workstations on a network to access the same dataset without having to copy data on each node. Shared storage is a key component in many IT architectures and system designs, especially in data centers, cloud computing environments, and high-performance computing scenarios. The main purpose of shared storage is to improve data availability, accessibility, and fault tolerance.

Shared storage has characteristics of high delay and high throughput, which results in poor adaptation of an existing vector retrieval solution in an application scenario of shared storage. Therefore, it is expected to provide a vector retrieval solution that can better adapt to shared storage.

SUMMARY

One or more embodiments of this application provide the following technical solutions:

This application provides a vector retrieval method, where a graph index constructed based on an original vector and a compression vector corresponding to the original vector are stored in a first-level storage resource; a node in the graph index is associated with a compression vector corresponding to an original vector represented by the node, and an edge in the graph index represents that a similarity relationship exists between original vectors corresponding to nodes connected to the edge; the original vector is stored in a second-level storage resource; data access performance of the first-level storage resource is better than data access performance of the second-level storage resource; and the method includes: in response to a query vector, obtaining, from the first-level storage resource, at least one target compression vector having a highest similarity with the query vector based on the graph index, and after obtaining the at least one target compression vector, obtaining at least one target original vector corresponding to the at least one target compression vector from the second-level storage resource; and separately calculating a similarity between the query vector and the at least one target original vector, sorting the at least one target original vector based on the calculated similarity, and determining, based on the sorted at least one target original vector, a vector retrieval result corresponding to the query vector.

This application further provides a vector retrieval apparatus, where a graph index constructed based on an original vector and a compression vector corresponding to the original vector are stored in a first-level storage resource; a node in the graph index is associated with a compression vector corresponding to an original vector represented by the node, and an edge in the graph index represents that a similarity relationship exists between original vectors corresponding to nodes connected to the edge; the original vector is stored in a second-level storage resource; data access performance of the first-level storage resource is better than data access performance of the second-level storage resource; and the apparatus includes: an acquisition module, configured to: in response to a query vector, obtain, from the first-level storage resource, at least one target compression vector having a highest similarity with the query vector based on the graph index, and after obtaining the at least one target compression vector, obtain at least one target original vector corresponding to the at least one target compression vector from the second-level storage resource; and a determining module, configured to: separately calculate a similarity between the query vector and the at least one target original vector, sort the at least one target original vector based on the calculated similarity, and determine, based on the sorted at least one target original vector, a vector retrieval result corresponding to the query vector.

This application further provides an electronic device, including: a processor; and a memory, configured to store instructions executable by the processor; where the processor runs the executable instructions to implement the steps of the method according to any item described above.

This application further provides a computer-readable storage medium. Computer instructions are stored on the computer-readable storage medium, and the instructions are executed by a processor to implement the steps of the method according to any item described above.

In the above-mentioned technical solutions, a graph index constructed based on an original vector and a compression vector corresponding to the original vector can be stored in a first-level storage resource, and the original vector is stored in a second-level storage resource. In addition, it is ensured that data access performance of the first-level storage resource is better than data access performance of the second-level storage resource. A node in the graph index can be associated with a compression vector corresponding to an original vector represented by the node, and an edge in the graph index can represent that a similarity relationship exists between original vectors corresponding to nodes connected to the edge. In this case, in response to a query vector, at least one target compression vector having a highest similarity with the query vector can be obtained from the first-level storage resource based on the graph index, and after all target compression vectors are obtained, at least one target original vector corresponding to the at least one target compression vector is obtained from the second-level storage resource. Subsequently, a similarity between the query vector and the at least one target original vector can be separately calculated, and the at least one target original vector is sorted based on the calculated similarity, so as to determine, based on the sorted at least one target original vector, a vector retrieval result corresponding to the query vector.

In the above-mentioned manner, a nearest neighbor search process based on the graph index can be decoupled from a data access operation for the second-level storage resource such as shared storage that is used to store an original vector. A synchronous data access operation does not need to be performed for the second-level storage resource in a search process, but after a compression vector having a highest similarity with the query vector is obtained by using the search process from the first-level storage resource such as an internal memory used to store the compression vector corresponding to the original vector and the graph index constructed based on the original vector, an original vector corresponding to the compression vector is obtained from the second-level storage resource. Therefore, a delay of vector retrieval can be reduced, so this vector retrieval solution can better adapt to shared storage.

BRIEF DESCRIPTION OF DRAWINGS

The following describes the accompanying drawings to be used in the description of example embodiments, where.

DESCRIPTION OF EMBODIMENTS

Figure 1:
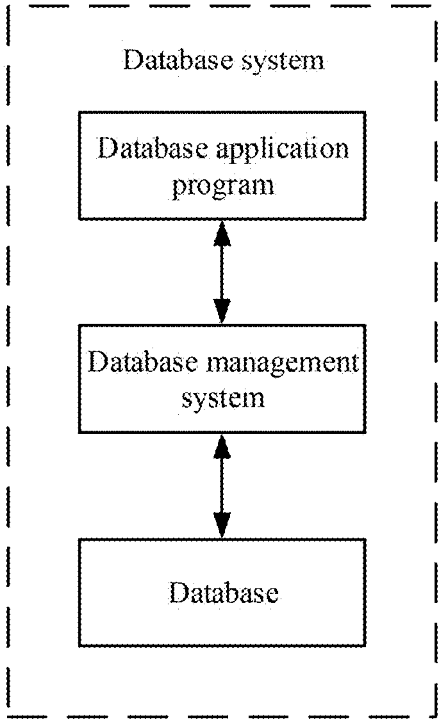
FIG. 1 is a schematic architectural diagram illustrating a database system, according to an example embodiment of this application.

Example embodiments are described in detail here, and examples of the example embodiments are presented in the accompanying drawings. When the following description relates to the accompanying drawings, unless specified otherwise, the same numbers in different accompanying drawings represent the same or similar elements. Implementations described in the following example embodiments do not represent all implementations consistent with one or more embodiments in this application. In contrast, they are merely examples consistent with some aspects of one or more embodiments of this application.

It is worthwhile to note that, in other embodiments, steps of a corresponding method are not necessarily performed based on a sequence shown and described in this application. In some other embodiments, the method can include more or fewer steps than that described in this application. In addition, a single step described in this application may be split into a plurality of steps in other embodiments for description; and a plurality of steps described in this application may be combined into a single step in other embodiments for description.

Vector retrieval is a technology for searching a high-dimensional space for a vector that is most similar to a given query vector. This technology is used in many fields, including but not limited to computer vision, natural language processing, recommendation systems, and information retrieval. In vector retrieval, data are typically represented as multidimensional vectors that exist in a multidimensional space, each dimension can represent one feature, and then similarity measurement is performed on these vectors (e.g., calculating the distance between these vectors) to find the most similar vectors. The objective of vector retrieval is to find a group of vectors in a large vector database that are most similar to a query vector.

Vector retrieval can be divided into two main types, exact nearest neighbor search (ENS) and approximate nearest neighbor search (ANNS). Exact nearest neighbor search returns a point exact nearest to a query vector. However, in a high-dimensional space, exact nearest neighbor search may be time consuming because a similarity between the query vector and each vector in a vector database needs to be calculated. Thus, approximate nearest neighbor search is often used in practical applications to quickly find a vector relatively most similar to the query vector, but do not guarantee that an absolute most similar vector is found. Approximate nearest neighbor search accelerates a search process by organizing data into a particular index structure, such as a K-dimensional tree, a hash table, or a hierarchical navigable small world graph (HNSW).

The HNSW algorithm is an internal memory-based, efficient solution to approximate nearest neighbor search problems, especially applicable to large-scale data sets in a high-dimensional space. The HNSW algorithm combines characteristics of a small world network and a multi-level index structure to achieve fast and accurate search. The small world network is a graph formed by some nodes and connections between them, and has two important features: a short path length and a high clustering coefficient. The short path length means that a shortest path length between any two nodes is usually very small, even when a network size is large. The high clustering coefficient means that nodes in a network tend to form dense local clusters.

The HNSW algorithm constructs a multi-level graph index, where each layer includes a sub-graph, and sub-graphs of a higher layer are sparser than those of a lower layer. Each node (representing a high-dimensional vector) can have multiple links at different layers, which enables the algorithm to search globally to locally, thereby rapidly converging to a nearest neighbor node.

An HNSW graph is formed by multiple layers, each layer contains fewer nodes, and the lowest layer contains all nodes. In each layer, nodes form a connected graph where each point is connected to a specific quantity of neighbor points called links. Link density of each layer generally increases gradually. As such, gradually from a higher layer to a lower layer until the lowest layer during search, a quantity of candidate points that need to be checked is reduced.

An index establishment process in the HNSW algorithm can include: selecting a node as a root node, and starting to construct the highest layer of the HNSW graph; and when a new node needs to be inserted, starting from the highest layer, randomly selecting a point as a start point, and then moving to a lower layer by using a greedy policy until a proper position is found for inserting the new point. During insertion, the algorithm calculates the distance between the new point and each point in the current layer (representing the distance between corresponding vectors) and determines whether a new link is to be established.

A search process in the HNSW algorithm can include: starting search from the highest level, and selecting an entry point. The entry point can be randomly selected, or can be selected by using a policy, for example, selecting a known point closest to a query point. In a current layer, all nodes connected to the entry point are checked, distances between these nodes and the query point are calculated, a node closest to the query point is selected as the target of next search, and the next layer is moved to. This process is repeated. In each layer, the algorithm traverses neighbor nodes of a current node, searches for a node closer to the query point, if a node closer to the query point is found, sets the node as the current node, and continues to search in this layer. Finally, the search will reach the lowest layer, which contains all nodes. In this layer, the search process will traverse nodes adjacent to the current best node again to further narrow the nearest neighbor range. Throughout the search process, the algorithm records several candidate points that are closest to the query point. When the search is complete, the candidate points are sorted according to the distances from the query point, and the nearest point is considered as an approximate nearest neighbor of the query point.

Due to the multi-level structure and short path length, the HNSW algorithm can implement fast approximate nearest neighbor search in a high-dimensional space. Moreover, the HNSW algorithm can efficiently process large-scale datasets because it only needs to maintain a small quantity of links associated with each node.

The disk-based approximate nearest neighbor (DiskANN) solution is a disk-based vector retrieval solution.

The DiskANN algorithm is an approximate nearest neighbor search algorithm, and is particularly suitable for processing large-scale high-dimensional data sets that cannot be fully loaded into an internal memory. Conventional approximate nearest neighbor search is usually performed entirely in the internal memory, and when the data set is too large to be fully stored in the internal memory, conventional approximate nearest neighbor search is no longer applicable. The DiskANN algorithm overcomes this limitation by storing data in the internal memory and the disk by layers and using multi-level indexes.

Using a hierarchical storage structure, the DiskANN algorithm keeps the most frequently accessed data in the internal memory, while storing less active data in the disk, enabling it to process data sets much larger than the internal memory. The DiskANN algorithm can also use the HNSW graph index to quickly locate a nearest neighbor, and the complete HNSW graph index is usually stored in the disk. Therefore, for the DiskANN algorithm, a disk input/output (I/O) operation needs to be performed for multiple times in the search process, and the disk I/O operation executed is a synchronous I/O operation, that is, after an I/O request for the disk is initiated each time, it is necessary to wait for a corresponding I/O result, so as to determine the target of next search by using the HNSW graph index stored in the disk.

An existing vector retrieval solution, such as the DiskANN algorithm, generally needs to perform a synchronous disk I/O operation for multiple times in the search process. Therefore, these vector retrieval solutions generally have a relatively high disk I/O cost, that is, a relatively large quantity of disk resources are consumed when the I/O operation is executed, and it is also more time-consuming, which causes a relatively high delay of the vector retrieval.

Shared storage is a storage resource shared between multiple computers. This storage mode allows multiple servers or workstations on a network to access the same dataset without having to copy data on each node. Shared storage is a key component in many IT architectures and system designs, especially in data centers, cloud computing environments, and high-performance computing scenarios. The main purpose of shared storage is to improve data availability, accessibility, and fault tolerance.

Shared storage can be classified according to different technologies, including network attached storage (NAS), storage area network (SAN), object storage, software-defined storage (SDS), distributed file system (DFS), cloud storage, etc.

Shared storage features a high delay and a high throughput. Applying an existing vector retrieval solution in an application scenario of shared storage generally means storing a vector database in shared storage. In practice, a storage medium of shared storage is usually a disk. Therefore, in addition to a disk I/O cost of the existing vector retrieval solution, a data packet may need to be transmitted on a network in an application scenario of shared storage, resulting in an additional network I/O cost, that is, an additional network resource and time may need to be consumed when an I/O operation is performed, thereby further increasing the delay of vector retrieval. In addition, because shared storage itself has a characteristic of a high delay, applying an existing vector retrieval solution in an application scenario of shared storage further increases the delay of shared storage, which may cause that it is difficult for a user to accept the delay of shared storage, affecting user experience of shared storage. Therefore, the existing vector retrieval solution has poor adaptation to shared storage.

This application provides a vector retrieval technical solution, aiming to reduce the delay of vector retrieval, so as to better adapt to shared storage.

In the vector retrieval solution provided in this application, a graph index constructed based on an original vector and a compression vector corresponding to the original vector can be stored in a first-level storage resource, and the original vector is stored in a second-level storage resource. In addition, it is ensured that data access performance of the first-level storage resource is better than data access performance of the second-level storage resource. A node in the graph index can be associated with a compression vector corresponding to an original vector represented by the node, and an edge in the graph index can represent that a similarity relationship exists between original vectors corresponding to nodes connected to the edge. In this case, in response to a query vector, at least one target compression vector having a highest similarity with the query vector can be obtained from the first-level storage resource based on the graph index, and after all target compression vectors are obtained, at least one target original vector corresponding to the at least one target compression vector is obtained from the second-level storage resource. Subsequently, a similarity between the query vector and the at least one target original vector can be separately calculated, and the at least one target original vector is sorted based on the calculated similarity, so as to determine, based on the sorted at least one target original vector, a vector retrieval result corresponding to the query vector.

In the above-mentioned manner, a nearest neighbor search process based on the graph index can be decoupled from a data access operation for the second-level storage resource such as shared storage that is used to store an original vector. A synchronous data access operation does not need to be performed for the second-level storage resource in a search process, but after a compression vector having a highest similarity with the query vector is obtained by using the search process from the first-level storage resource such as an internal memory used to store the compression vector corresponding to the original vector and the graph index constructed based on the original vector, an original vector corresponding to the compression vector is obtained from the second-level storage resource. Therefore, a delay of vector retrieval can be reduced, so this vector retrieval solution can better adapt to shared storage.

Referring to FIG. 1, FIG. 1 is a schematic architectural diagram illustrating a database system, according to an example embodiment of this application.

The database system is a software system for storing, managing and retrieving data. As shown in FIG. 1, the database system can include at least a database, a database management system (DBMS), and a database application program.

The database is a set of actually stored data. Data are organized in the database according to a specific pattern or model to facilitate retrieval and management. In this application, the database can be specifically a vector database. In the vector database, data are usually represented as multi-dimensional vectors that exist in a multidimensional space, and each dimension can represent one feature.

The database management system is a software system. It is a core component for controlling and managing the database, and can be used to define, create, maintain, and operate the database. The database management system provides a range of tools and interfaces for managing the database, such as interfaces for create, read, update, and delete operations. The database management system is mainly used to control data storage, retrieval, update, and management, and is also responsible for data accuracy, consistency, security, and backup recovery.

The database application program refers to a front-end application program that interacts with the database, and is used to implement specific service logic and functions. It can provide a user-oriented interface, which can be specifically a graphical user interface, a command line, or another form of interface.

In practice, a user can initiate a specific operation for the database by using the database application program (for example, an index construction operation, a data retrieval operation, etc.), and the database management system can perform these operations for the database.

The database and the database management system can be deployed on a server. The server can be a server that includes one independent physical host, or can be a server cluster that includes multiple independent physical hosts. Or the server can be a virtual server, a cloud server, etc. carried by a host cluster. The database application program can be deployed on a terminal device establishing a network (including multiple types of wired networks or wireless networks) connection to the server. The terminal device can be a personal computer (PC), a desktop computer, a notebook computer, a tablet computer, a smartphone, a personal digital assistant (PDA), etc.

Figure 2:
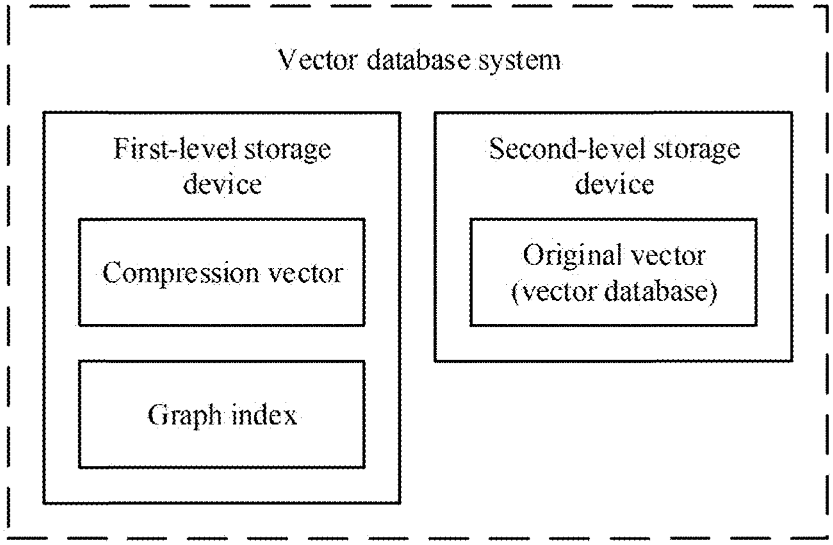
FIG. 2 is a schematic diagram illustrating data deployment of a vector database system, according to an example embodiment of this application.

Referring to FIG. 2, FIG. 2 is a schematic diagram illustrating data deployment of a vector database system, according to an example embodiment of this application;

The vector database system is a database system that is specially used to store, manage, and retrieve data of a vector type. Similar to the database system shown in FIG. 1, the vector database system can also include a vector database and a vector database management system. In practice, the vector database is a set of actually stored vectors, and the vector database management system can maintain an index created for a vector in the vector database, so the vector database management system can use the index to perform vector retrieval, and speed up vector retrieval.

As shown in FIG. 2, in the vector database system, vectors and indexes can be stored in a hierarchical storage manner.

Specifically, on one hand, vectors stored in the vector database can be referred to as original vectors. These original vectors can be stored in a second-level storage resource, that is, the vector database can be deployed in the second-level storage resource.

On the other hand, an index can be created for the original vectors in the vector database, and specifically, a graph index can be constructed based on these original vectors. The graph index can be similar to the HNSW graph index. In addition, a compression vector corresponding to the original vector in the vector database can be calculated. The graph index and all or a part of these compression vectors can be stored in the first-level storage resource, that is, the vector database management system can maintain the graph index and all or a part of these compression vectors in the first-level storage resource.

The storage resource refers to various hardware and software systems that are used to store data.

For the graph index, a node in the graph index can represent an original vector, and is associated with a compression vector corresponding to the original vector represented by the node, for example, the compression vector corresponding to the original vector represented by the node can be used as a label or an attribute of the node. An edge in the graph index can represent that a similarity relationship exists between original vectors (i.e., original vectors represented by the node) corresponding to nodes connected to the edge.

It is worthwhile to note that the original vector represented by the node in the graph index is not stored in the first-level storage resource, but only the compression vector associated with the node is stored in the first-level storage resource, so as to reduce occupation of the first-level storage resource. The original vector represented by the node is stored in the second-level storage resource.

In some embodiments, a compression vector corresponding to an original vector can be a vector obtained after product quantization (PQ) is performed on the original vector.

Product quantization is an effective technology for compressing high-dimensional vectors, mainly used for approximate nearest neighbor search. When an original vector is compressed by using product quantization, a high-dimensional vector space can be first divided into multiple low-dimensional sub-spaces (assume that a dimensionality of the original vector is D, the original vector can be divided into M sub-spaces, and a dimensionality of each sub-space is D/M). For each sub-space, a codebook is constructed by using a clustering algorithm (for example, a K-means algorithm), and each element (which can be referred to as a codeword) in the codebook represents a clustering center of the sub-space. After the original vector is divided into M sub-vectors, a codeword closest to each sub-vector is found in a corresponding sub-space codebook. This process is referred to as quantization, and after quantization, each sub-vector is replaced with a codeword index corresponding to the sub-vector. Finally, the quantized codeword index is stored to form a final compression representation of the original vector, that is, a compression vector corresponding to the original vector. Because a storage space occupied by the codeword index is generally far less than a storage space occupied by a floating-point value of the original vector, data compression for the original vector is implemented.

Accordingly, the query vector is also divided, quantized, and encoded when approximate nearest neighbor search is performed. Then, search is performed in the codebook index based on similarity measurement of the codeword index to find a possible approximate nearest neighbor.

That is, when nearest neighbor search is performed based on the graph index, similarity measurement is performed for the query vector (specifically a compression vector corresponding to the query vector) and a compression vector associated with a node in the graph index, so as to determine at least one compression vector most similar to the query vector.

It is worthwhile to note that data access performance of the first-level storage resource can be better than data access performance of the second-level storage resource. That is, a delay of accessing data stored in the first-level storage resource can be lower than a delay of accessing data stored in the second-level storage resource.

In some embodiments, because the processor can directly access the internal memory, but requires an I/O operation to access the disk, a delay in accessing data stored in the internal memory is lower than a delay in accessing data stored in the disk. Therefore, the first-level storage resource can be an internal memory, and the second-level storage resource can be a storage resource of a shared storage service. The shared storage service is a service for providing shared storage, and the storage resource of the shared storage service is shared storage itself.

In practice, the first-level storage resource can be specifically an internal memory of a server used to deploy the vector database management system. The second-level storage resource can be a local disk. That is, the vector database and the vector database management system can be deployed on the same server. In this case, a disk of the server can be used as the second-level storage resource. Or the second-level storage resource can be a remote disk. That is, the vector database can be deployed on a disk connected by using a network to a server used to deploy the vector database management system. In this case, the disk can be used as the second-level storage resource. The remote disk can be implemented by using multiple technologies, such as network attached storage, storage area network, or cloud storage. The remote disk usually needs to be accessed through network protocols such as TCP/IP, ISCSI, NFS, and CIFS. Or the second-level storage resource can be a disk used by a distributed file system, object storage, etc.

In some embodiments, when the graph index is constructed based on the original vector, specifically, on one hand, each node in the graph index can be constructed based on each original vector, that is, each node in the graph index represents each original vector. On the other hand, a similarity between every two original vectors can be calculated, and an edge in the graph index can be constructed based on the calculated similarity. In the graph index, the distance between two nodes can be inversely proportional to a similarity between original vectors respectively represented by the two nodes. If the two nodes are connected by using one edge, it indicates that the similarity between the original vectors respectively represented by the two nodes is relatively high, that is, the original vectors respectively represented by the two nodes are near neighbors to each other, and this edge can represent that a similarity relationship (or referred to as a near neighbor relationship) exists between the original vectors respectively represented by the two nodes.

Figure 3:
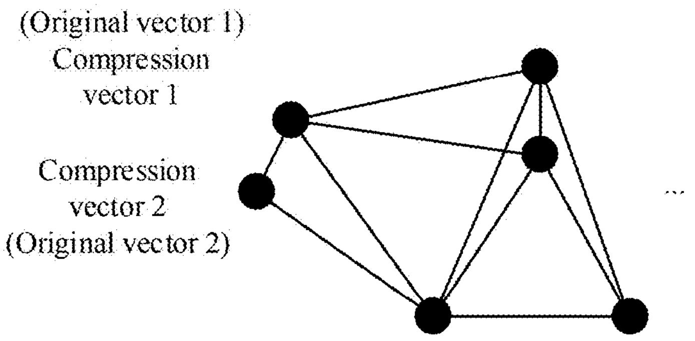
FIG. 3 is a schematic diagram illustrating a graph index, according to an example embodiment of this application.

Referring to FIG. 3, FIG. 3 is a schematic diagram illustrating a graph index, according to an example embodiment of this application.

As shown in FIG. 3, in the graph index, one node can represent one original vector, and the node is associated with a compression vector corresponding to the original vector. For example, the compression vector can be used as a label or an attribute of the node. One edge can represent that a similarity relationship exists between original vectors respectively corresponding to two nodes connected to the edge.

For the graph index shown in FIG. 3, the first-level storage resource stores the graph index and compression vectors respectively corresponding to all original vectors.

In some embodiments, when the graph index is constructed based on the original vector, specifically, the original vector can be first divided into at least one vector group, and an aggregation vector corresponding to each vector group is determined.

It is worthwhile to note that, for a vector group, original vectors included in the vector group are similar to each other. That is, original vectors similar to each other in the above-mentioned original vectors can be divided into one vector group. An aggregation vector corresponding to the vector group can be a representative original vector in the original vectors included in the vector group.

Then, on one hand, each node in the graph index can be constructed based on the aggregation vector corresponding to each vector group, that is, each node in the graph index represents each aggregation vector, and a node used to represent each aggregation vector is associated with the vector group corresponding to each aggregation vector. Specifically, each original vector included in each vector group can be converted into a compression vector corresponding to the original vector, to obtain a vector group including the compression vector, and a node used to represent each aggregation vector is associated with a compression vector included in the vector group corresponding to each aggregation vector. On the other hand, a similarity between every two aggregation vectors in these aggregation vectors can be calculated, and the edge in the graph index can be constructed based on the calculated similarity. In the graph index, the distance between two nodes can be inversely proportional to a similarity between aggregation vectors respectively represented by the two nodes. If the two nodes are connected by using one edge, it indicates that the similarity between the aggregation vectors respectively represented by the two nodes is relatively high, that is, the aggregation vectors respectively represented by the two nodes are near neighbors to each other, and this edge can represent that a similarity relationship (or referred to as a near neighbor relationship) exists between the aggregation vectors respectively represented by the two nodes.

In some embodiments, when the original vectors are divided into at least one vector group, and the aggregation vector corresponding to each vector group is determined, the vector group can be obtained through division before the aggregation vector is determined. That is, the original vectors are first divided into at least one vector group, and after all vector groups are obtained through division, one original vector is selected from the original vectors included in each vector group as the aggregation vector corresponding to each vector group. By using any vector group obtained through division as an example, one original vector can be selected from original vectors included in the vector group according to a specific rule or randomly, and used as an aggregation vector corresponding to the vector group.

Or the aggregation vector can be determined before the vector group is obtained through division. That is, at least one original vector is first selected from the original vectors according to a specific rule or randomly as the aggregation vector corresponding to the at least one vector group, where the selected aggregation vector is in a one-to-one correspondence with the vector group, and then an original vector similar to each aggregation vector is added to the vector group corresponding to each aggregation vector. By using any selected aggregation vector as an example, an original vector similar to the aggregation vector in remaining original vectors except these aggregation vectors can be added to a vector group corresponding to the aggregation vector.

In some embodiments, for a vector group obtained through division, original vectors included in the vector group are similar to each other, which means that the similarity between the original vectors included in the vector group is not less than a predetermined first threshold. That is, it can be considered that the original vectors included in the vector group are nearest neighbors to each other. Or a repetition quantity of original vectors whose similarity with each original vector included in the vector group is not less than a predetermined second threshold is not less than a predetermined third threshold, that is, it can be considered that a repetition quantity of nearest neighbors of each original vector included in the vector group is not less than the third threshold.

Figure 4:
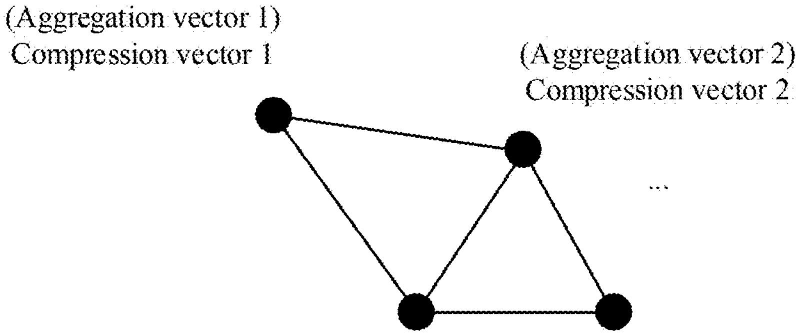
FIG. 4 is a schematic diagram illustrating another graph index, according to an example embodiment of this application.

Referring to FIG. 4, FIG. 4 is a schematic diagram illustrating another graph index, according to an example embodiment of this application.

As shown in FIG. 4, in the graph index, one node can represent one aggregation vector, and the node is associated with a compression vector included in a vector group corresponding to the aggregation vector (obtained by converting an original vector included in the vector group). For example, the compression vector included in the vector group corresponding to the aggregation vector can be used as a label or an attribute of the node. One edge can represent that a similarity relationship exists between aggregation vectors respectively corresponding to two nodes connected to the edge.

For the graph index shown in FIG. 4, the first-level storage resource stores the graph index and compression vectors respectively corresponding to all aggregation vectors (that is, a part of all original vectors).

By performing aggregation processing on the original vector and constructing the graph index based on the aggregation vector, a scale of the graph index can be reduced, so storage overheads of the graph index can be reduced, computing resources consumed when nearest neighbor search is performed based on the graph index can be reduced, and a scale of data that can be processed by a single computer (for example, a quantity of vectors included in a vector database) can be increased.

Figure 5:
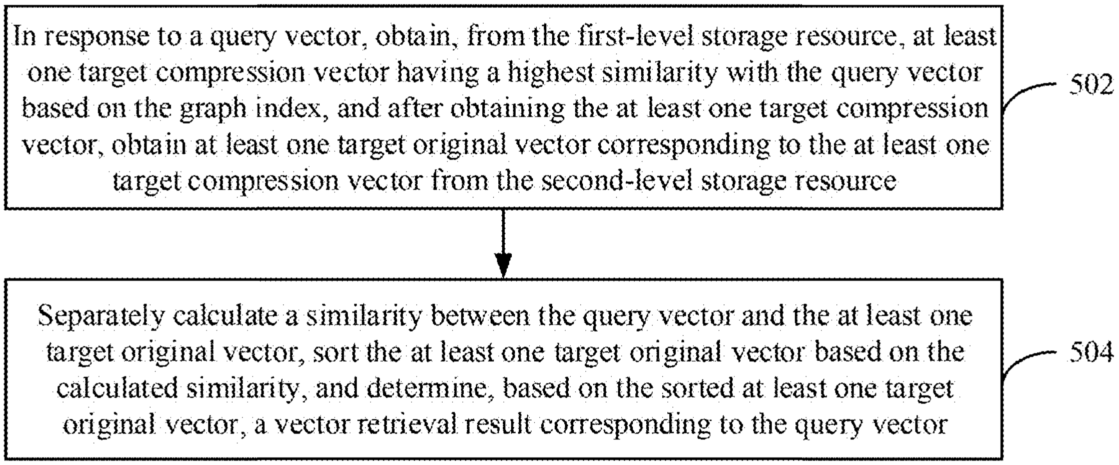
FIG. 5 is a flowchart illustrating a vector retrieval method, according to an example embodiment of this application.

Referring to FIG. 5, FIG. 5 is a flowchart illustrating a vector retrieval method, according to an example embodiment of this application.

The embodiment shown in FIG. 5 can be applied to the vector database system for storing vectors and indexes in a hierarchical storage manner as shown in FIG. 2.

It is worthwhile to note that in product quantization, one high-dimensional vector is decomposed into several low dimensional vectors, and each low dimensional vector is quantized and represented by one index. Thus, a complete vector can be represented by a combination of these indexes. This quantization method can greatly reduce storage and computation costs, but also introduce errors. Because a part of information is lost in a quantization process, a similarity calculated based on a vector obtained after product quantization may be different from a similarity calculated based on an original vector.

Similarly, a similarity calculated based on a compression vector obtained in another manner may also be different from the similarity calculated based on the original vector.

After at least one compression vector that is most similar to a query vector (which can be relatively most similar) is obtained by using nearest neighbor search, usually at least one original vector corresponding to the at least one compression vector further needs to be rearranged according to a similarity with the query vector, so as to determine a final vector retrieval result corresponding to the query vector.

As shown in FIG. 5, the vector retrieval method can include the following steps:

Step 502: In response to a query vector corresponding to the vector database, obtain, from the first-level storage resource, at least one target compression vector having a highest similarity with the query vector based on the graph index, and after obtaining the at least one target compression vector, obtain at least one target original vector corresponding to the at least one target compression vector from the second-level storage resource.

In this embodiment, in a case in which a query vector used to perform vector retrieval in the vector database is obtained, a response can be made thereto. Specifically, the at least one compression vector (which can be referred to as a target compression vector) having a highest similarity with the query vector can be obtained from the first-level storage resource by performing nearest neighbor search based on the graph index, and after nearest neighbor search is completed and all target compression vectors are obtained, the at least one original vector (which can be referred to as a target original vector) corresponding to the at least one target compression vector is obtained from the second-level storage resource. An original vector corresponding to a target compression vector can be an original vector directly corresponding to the target compression vector, or can be an original vector included in a vector group to which an aggregation vector corresponding to the target compression vector belongs. As such, it is no longer necessary to perform a synchronous data access operation on the second-level storage resource in a search process.

It is worthwhile to note that in K-nearest neighbor search, the K value usually refers to a quantity of nearest neighbors to be searched. In this application, the K value can be predetermined according to an actual requirement. In this case, K (it can alternatively be greater than K, for example, an integer multiple of K) compression vectors having a highest similarity with the query vector can be obtained from the first-level storage resource based on the graph index as the at least one target compression vector.

Specifically, if one node in the graph index represents one original vector, K compression vectors having a highest similarity with the query vector can be obtained from the first-level storage resource based on the graph index as the at least one target compression vector. If one node in the graph index represents one aggregation vector, a specific quantity of compression vectors having a highest similarity with the query vector can be obtained from the first-level storage resource based on the graph index, so a total quantity of original vectors included in vector groups to which aggregation vectors corresponding to the compression vectors belong is not less than the K value. In this case, the compression vectors included in the vector groups respectively corresponding to the aggregation vectors can be used as the at least one target compression vector.

In some embodiments, after the at least one target compression vector is obtained, and when the at least one target original vector corresponding to the at least one target compression vector is obtained from the second-level storage resource, specifically, after all target compression vectors are obtained, a data access request corresponding to the second-level storage resource can be initiated (assume that the second-level storage resource is a distributed file system, the data access request can be an I/O request for the distributed file system). In this case, the data access request can be used to obtain the at least one target original vector corresponding to the at least one target compression vector from the second-level storage resource. Subsequently, a data access result corresponding to the data access request can be obtained, so the at least one target original vector corresponding to the at least one target compression vector can be obtained from the data access result.

That is, after all target compression vectors having a highest similarity with the query vector are obtained from the first-level storage resource by completing nearest neighbor search based on the graph index, the target original vectors respectively corresponding to the target compression vectors can be obtained from the second-level storage resource through one time of data access for the second-level storage resource.

In some embodiments, after the at least one target compression vector is obtained, and when the at least one target original vector corresponding to the at least one target compression vector is obtained from the second-level storage resource, specifically, an asynchronous data access request corresponding to the second-level storage resource can be initiated each time a target compression vector is obtained, where "asynchronous" means that it is unnecessary to bock and wait for a request to be returned after the data access request is initiated. In this case, the data access request can be used to obtain, from the second-level storage resource, the target original vector corresponding to the target compression vector. After all target compression vectors are obtained, each initiated data access request corresponding to the second-level storage resource can be used to obtain, from the second-level storage resource, a target original vector corresponding to one target compression vector. In this case, all data access results corresponding to all initiated data access requests can be obtained, so the at least one target original vector corresponding to the at least one target compression vector can be obtained from all the data access results.

That is, an asynchronous data access request for the second-level storage resource can be initiated once each time a target compression vector is obtained from the first-level storage resource by performing nearest neighbor search based on the graph index. But before completion of nearest neighbor search, it is unnecessary to block and wait for obtaining a data access result corresponding to the data access request. Instead, after nearest neighbor search is completed based on the graph index to obtain all target compression vectors having a highest similarity with the query vector from the first-level storage resource, the target original vectors respectively corresponding to the target compression vectors are obtained from the second-level storage resource by using obtained data access results corresponding to all initiated data access requests.

Step 504: Separately calculate a similarity between the query vector and the at least one target original vector, sort the at least one target original vector based on the calculated similarity, and determine, based on the sorted at least one target original vector, a vector retrieval result corresponding to the query vector.

In this embodiment, for the at least one target original vector corresponding to the at least one target compression vector obtained from the second-level storage resource, the similarity between the query vector and the target original vectors can be separately calculated, the target original vectors are sorted based on the calculated similarity, and the vector retrieval result corresponding to the query vector is determined based on the sorted at least one target original vector.

In some embodiments, when the at least one target original vector is sorted based on the calculated similarity, and the vector retrieval result corresponding to the query vector is determined based on the sorted at least one target original vector, specifically, the target original vectors can be sorted in descending order of the calculated similarities, and a predetermined quantity (which can be the K value) of top arranged target original vectors as the vector retrieval result corresponding to the query vector based on the sorted at least one target original vector.

In the vector retrieval solution provided in this application, a graph index constructed based on an original vector and a compression vector corresponding to the original vector can be stored in a first-level storage resource, and the original vector is stored in a second-level storage resource. In addition, it is ensured that data access performance of the first-level storage resource is better than data access performance of the second-level storage resource. A node in the graph index can be associated with a compression vector corresponding to an original vector represented by the node, and an edge in the graph index can represent that a similarity relationship exists between original vectors corresponding to nodes connected to the edge. In this case, in response to a query vector, at least one target compression vector having a highest similarity with the query vector can be obtained from the first-level storage resource based on the graph index, and after all target compression vectors are obtained, at least one target original vector corresponding to the at least one target compression vector is obtained from the second-level storage resource. Subsequently, a similarity between the query vector and the at least one target original vector can be separately calculated, and the at least one target original vector is sorted based on the calculated similarity, so as to determine, based on the sorted at least one target original vector, a vector retrieval result corresponding to the query vector.

In the above-mentioned manner, a nearest neighbor search process based on the graph index can be decoupled from a data access operation for the second-level storage resource such as shared storage that is used to store an original vector. A synchronous data access operation does not need to be performed for the second-level storage resource in a search process, but after a compression vector having a highest similarity with the query vector is obtained by using the search process from the first-level storage resource such as an internal memory used to store the compression vector corresponding to the original vector and the graph index constructed based on the original vector, an original vector corresponding to the compression vector is obtained from the second-level storage resource. Therefore, a delay of vector retrieval can be reduced, so this vector retrieval solution can better adapt to shared storage.

Corresponding to the embodiment of the vector retrieval method, this application further provides an embodiment of a vector retrieval apparatus.

Figure 6:
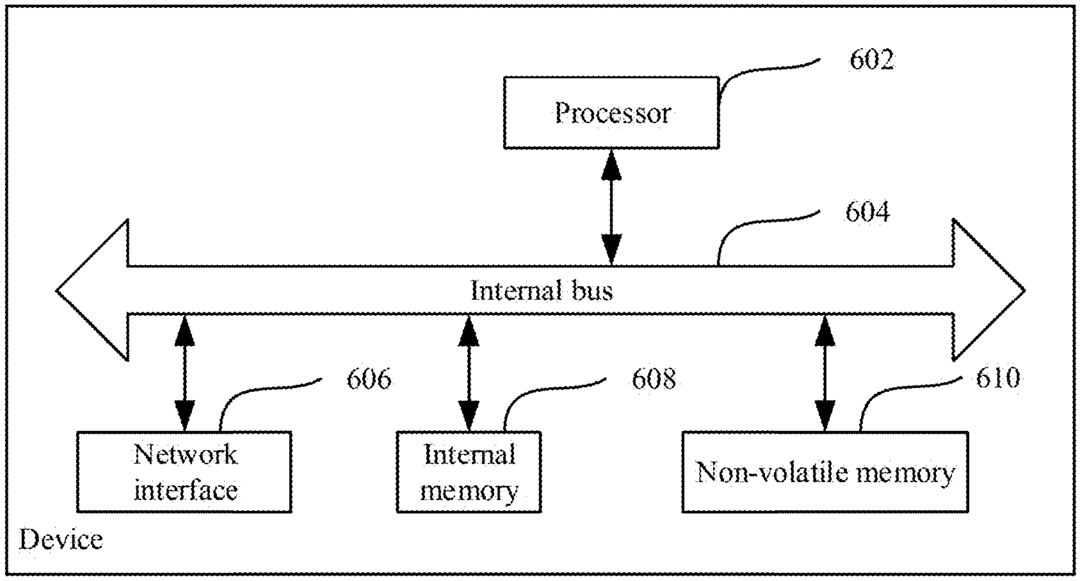
FIG. 6 is a schematic structural diagram illustrating a device, according to an example embodiment of this application.

Referring to FIG. 6, FIG. 6 is a schematic structural diagram illustrating a device, according to an example embodiment of this application. In terms of hardware, the device includes a processor 602, an internal bus 604, a network interface 606, an internal memory 608, and a non-volatile memory 610, and certainly may further include other needed hardware. One or more embodiments of this application can be implemented in a software-based way, for example, the processor 602 reads a corresponding computer program from the non-volatile memory 610 to the internal memory 608, and then runs the computer program. Certainly, in addition to a software implementation, one or more embodiments of this application do not rule out other implementations, such as an implementation of a logic device or a combination of software and hardware. In other words, an execution body of the following processing procedure is not limited to each logical module, and can be hardware or a logic device.

Figure 7:
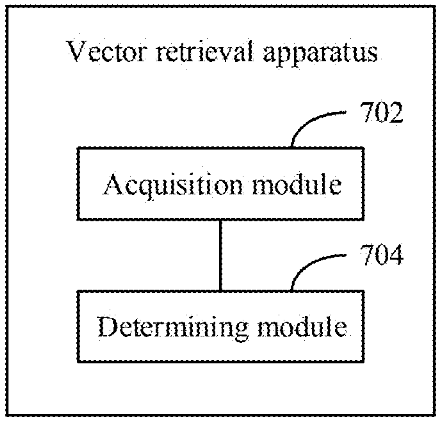
FIG. 7 is a block diagram illustrating a vector retrieval apparatus, according to an example embodiment of this application.

Referring to FIG. 7, FIG. 7 is a block diagram illustrating a vector retrieval apparatus, according to an example embodiment of this application.

The vector retrieval apparatus can be applied to the device shown in FIG. 6, so as to implement the technical solution of this application. A graph index constructed based on an original vector and a compression vector corresponding to the original vector are stored in a first-level storage resource; a node in the graph index is associated with a compression vector corresponding to an original vector represented by the node, and an edge in the graph index represents that a similarity relationship exists between original vectors corresponding to nodes connected to the edge; the original vector is stored in a second-level storage resource; data access performance of the first-level storage resource is better than data access performance of the second-level storage resource; and the apparatus includes: an acquisition module 702, configured to: in response to a query vector, obtain, from the first-level storage resource, at least one target compression vector having a highest similarity with the query vector based on the graph index, and after obtaining the at least one target compression vector, obtain at least one target original vector corresponding to the at least one target compression vector from the second-level storage resource; and a determining module 704, configured to: separately calculate a similarity between the query vector and the at least one target original vector, sort the at least one target original vector based on the calculated similarity, and determine, based on the sorted at least one target original vector, a vector retrieval result corresponding to the query vector.

In some embodiments, the graph index is constructed based on the original vector by using the following steps: dividing the original vector into at least one vector group, and determining an aggregation vector corresponding to each vector group, where original vectors included in each vector group are similar to each other; and the aggregation vector is an original vector in the original vectors included in the vector group; constructing a node in the graph index based on the aggregation vector corresponding to each vector group, and associating a node used to represent each aggregation vector with a compression vector corresponding to each aggregation vector; and calculating a similarity between every two aggregation vectors in the aggregation vectors, and constructing an edge in the graph index based on the calculated similarity.

In some embodiments, the dividing the original vector into at least one vector group, and determining an aggregation vector corresponding to each vector group includes:

dividing the original vector into at least one vector group, and after obtaining the at least one vector group through division, selecting an original vector from original vectors included in each vector group as an aggregation vector corresponding to each vector group; or selecting at least one original vector from the original vector as an aggregation vector corresponding to the at least one vector group, and adding an original vector similar to each aggregation vector to a vector group corresponding to each aggregation vector.

In some embodiments, a similarity between the original vectors included in the vector group is not less than a predetermined first threshold; or a repetition quantity of original vectors whose similarity with each original vector included in the vector group is not less than a predetermined second threshold is not less than a predetermined third threshold.

In some embodiments, the obtaining at least one target original vector corresponding to the at least one target compression vector from the second-level storage resource includes: obtaining at least one target aggregation vector corresponding to the at least one target compression vector from the second-level storage resource, and further obtaining an original vector included in a vector group to which each target aggregation vector belongs as the at least one target original vector corresponding to the at least one target compression vector.

In some embodiments, after obtaining the at least one target compression vector, the obtaining at least one target original vector corresponding to the at least one target compression vector from the second-level storage resource includes: after obtaining the at least one target compression vector, initiating a data access request corresponding to the second-level storage resource, where the data access request is used to obtain at least one target original vector corresponding to the at least one target compression vector from the second-level storage resource; and obtaining a data access result corresponding to the data access request, where the data access result includes the at least one target original vector.

In some embodiments, after obtaining the at least one target compression vector, the obtaining at least one target original vector corresponding to the at least one target compression vector from the second-level storage resource includes: each time a target compression vector is obtained, initiating an asynchronous data access request corresponding to the second-level storage resource, where the data access request is used to obtain a target original vector corresponding to the target compression vector from the second-level storage resource; and after obtaining the at least one target compression vector, obtaining a data access result corresponding to the initiated data access request, where the data access result includes at least one target original vector corresponding to the at least one target compression vector.

In some embodiments, the sorting the at least one target original vector based on the calculated similarity, and determining, based on the sorted at least one target original vector, a vector retrieval result corresponding to the query vector includes: sorting the at least one target original vector in descending order of the calculated similarities, and determining, based on the sorted at least one target original vector, a predetermined quantity of top arranged target original vectors as the vector retrieval result corresponding to the query vector.

In some embodiments, the compression vector is a vector obtained after product quantization is performed on the original vector.

In some embodiments, the first-level storage resource includes an internal memory; and the second-level storage resource includes a storage resource of a shared storage service.

The apparatus embodiments basically correspond to the method embodiments. Therefore, for related parts, references can be made to partial descriptions in the method embodiments. The described apparatus embodiments are merely illustrative. The modules described as separate parts may or may not be physically separated, and parts displayed as modules may or may not be physical modules, that is, may be located in a same place or may be distributed to multiple network modules. Some or all of the modules or units can be selected based on actual needs to achieve the objectives of the technical solutions in this application.

The system, apparatus, module, or unit illustrated in the above-mentioned embodiments can be implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email receiving/sending device, a game console, a tablet computer, a wearable device, or a combination of any several of these devices.

In a typical configuration, the computer includes one or more central processing units (CPUs), an input/output interface, a network interface, and an internal memory.

The internal memory may include a non-persistent storage, a random access memory (RAM), and/or a nonvolatile memory in a computer-readable medium, for example, a read-only memory (ROM) or a flash read-only memory (flash RAM). The internal memory is an example of the computer-readable medium.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a disk memory, a quantum memory, a graphene-based storage medium, another magnetic storage device, or any other non-transmission medium. The computer storage medium can be configured to store information that can be accessed by a computing device. Based on the definition in this specification, the computer-readable medium does not include transitory media such as a modulated data signal and carrier.

It is worthwhile to note that the terms "include", "contain", or any other variant thereof are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Specific embodiments of this application are described above. Other embodiments fall within the scope of this specification. In some cases, actions or steps described in the application can be performed in a sequence different from that in the embodiments and desired results can still be achieved. In addition, the process depicted in the accompanying drawings does not necessarily need a particular execution order to achieve the desired results. In some implementations, multi-tasking and concurrent processing are feasible or may be advantageous.

Terms used in one or more embodiments of this application are merely used to describe specific embodiments, and are not intended to limit the one or more embodiments of this application. The terms "a" and "the" of singular forms are also intended to include plural forms, unless otherwise specified in the context clearly. The term "and/or" indicates and includes any or all possible combinations of one or more associated listed items.

Descriptions of the terms "one embodiment", "some embodiments", "example", "specific example", or "one implementation" used in one or more embodiments of this application mean that a specific feature or characteristic described with reference to this embodiment is included in at least one embodiment of this application. A schematic description of these terms is not necessarily with respect to the same embodiment. In addition, the described specific feature or characteristic can be combined in a proper way in one or more embodiments of this application. In addition, without contradicting each other, different embodiments and specific features or characteristics in the different embodiments can be combined.

It should be understood that although terms "first", "second", "third", etc. may be used in one or more embodiments of this application to describe various types of information, the information is not limited to these terms. These terms are only used to distinguish between information of the same type. For example, without departing from the scope of one or more embodiments of this application, first information can also be referred to as second information, and similarly, the second information can be referred to as the first information. Depending on the context, for example, the word "if" used here can be explained as "while", "when", or "in response to determining".

The above-mentioned descriptions are merely preferred embodiments in one or more embodiments of this application, but are not intended to limit the one or more embodiments of this application. Any modification, equivalent replacement, improvement, etc. made without departing from the spirit and principle of the one or more embodiments of this application shall fall within the protection scope of the one or more embodiments of this application.

User information (including but not limited to user equipment information, personal user information, etc.) and data (including but not limited to data used for analysis, stored data, displayed data, etc.) in this application are information and data that are authorized by a user or that are fully authorized by each party. Furthermore, related data need to be collected, used, and processed in compliance with relevant laws, regulations and standards of relevant countries and regions, and corresponding operation entries are provided for the user to choose to authorize or reject.

What is claimed is:

1. A computer-implemented method for vector retrieval, comprising:

in response to a query vector:

obtaining, from an internal memory comprised in a first-level storage resource, at least one target compression vector having a highest similarity with the query vector based on a graph index, wherein the internal memory is directly accessible by a processor; and after obtaining the at least one target compression vector, obtaining at least one target original vector corresponding to the at least one target compression vector from a disk comprised in a second-level storage resource, comprising:

after obtaining the at least one target compression vector, initiating a data access request corresponding to the second-level storage resource, wherein the data access request is used to obtain at least one target original vector corresponding to the at least one target compression vector from the second-level storage resource; and obtaining a data access result corresponding to the data access request, wherein the data access result comprises the at least one target original vector, wherein the graph index is constructed by generating, for each original vector stored in the second-level storage resource, a corresponding node of the graph index, and storing, in the first-level storage resource, a compression vector associated with the original vector, wherein an edge in the graph index represents that a similarity relationship exists between original vectors corresponding to nodes connected to the edge, wherein the original vector is stored in the second-level storage resource, and wherein a data access delay of the internal memory is lower than a data access delay of the disk; and separately:

calculating, as a calculated similarity, a similarity between the query vector and the at least one target original vector;

sorting, as a sorted at least one target original vector, the at least one target original vector based on the calculated similarity; and determining, based on the sorted at least one target original vector, a vector retrieval result corresponding to the query vector.

2. The computer-implemented method of claim 1, wherein:

the graph index is constructed based on the original vector by:

dividing the original vector into at least one vector group, and determining an aggregation vector corresponding to each vector group, wherein original vectors comprised in each vector group are similar to each other; and the aggregation vector is an original vector in the original vectors comprised in the vector group;

constructing a node in the graph index based on the aggregation vector corresponding to each vector group, and associating a node used to represent each aggregation vector with a compression vector corresponding to each aggregation vector; and calculating a similarity between every two aggregation vectors in the aggregation vectors, and constructing an edge in the graph index based on the calculated similarity.

3. The computer-implemented method of claim 2, wherein dividing the original vector into at least one vector group, and determining an aggregation vector corresponding to each vector group, comprises:

dividing the original vector into at least one vector group; and after obtaining the at least one vector group through division:

selecting an original vector from original vectors comprised in each vector group as an aggregation vector corresponding to each vector group; or selecting at least one original vector from the original vector as an aggregation vector corresponding to the at least one vector group, and adding an original vector similar to each aggregation vector to a vector group corresponding to each aggregation vector.

4. The computer-implemented method of claim 2, wherein:

a similarity between the original vectors comprised in the vector group is not less than a predetermined first threshold; or a repetition quantity of original vectors whose similarity with each original vector comprised in the vector group is not less than a predetermined second threshold is not less than a predetermined third threshold.

5. The computer-implemented method of claim 2, wherein obtaining at least one target original vector corresponding to the at least one target compression vector from the second-level storage resource, comprises:

obtaining at least one target aggregation vector corresponding to the at least one target compression vector from the second-level storage resource; and obtaining an original vector comprised in a vector group to which each target aggregation vector belongs as the at least one target original vector corresponding to the at least one target compression vector.

6. The computer-implemented method of claim 1, wherein, after obtaining the at least one target compression vector, obtaining at least one target original vector corresponding to the at least one target compression vector from the second-level storage resource, comprises:

each time a target compression vector is obtained, initiating, as an initiated data access request, an asynchronous data access request corresponding to the second-level storage resource, wherein the asynchronous data access request is used to obtain a target original vector corresponding to the target compression vector from the second-level storage resource; and after obtaining the at least one target compression vector, obtaining a data access result corresponding to the initiated data access request, wherein the data access result comprises at least one target original vector corresponding to the at least one target compression vector.

7. The computer-implemented method of claim 1, wherein sorting the at least one target original vector based on the calculated similarity, and determining, based on the sorted at least one target original vector, a vector retrieval result corresponding to the query vector comprises:

sorting the at least one target original vector in descending order of calculated similarities, and determining, based on the sorted at least one target original vector, a predetermined quantity of top arranged target original vectors as the vector retrieval result corresponding to the query vector.

8. The computer-implemented method of claim 1, wherein the compression vector is a vector obtained after product quantization is performed on the original vector.

9. The computer-implemented method of claim 1, wherein:

the first-level storage resource comprises an internal memory; and the second-level storage resource comprises a storage resource of a shared storage service.

10. A non-transitory, computer-readable medium storing one or more instructions executable by a computer system to perform one or more operations, comprising:

in response to a query vector:

obtaining, from an internal memory comprised in a first-level storage resource, at least one target compression vector having a highest similarity with the query vector based on a graph index, wherein the internal memory is directly accessible by a processor; and after obtaining the at least one target compression vector, obtaining at least one target original vector corresponding to the at least one target compression vector from a disk comprised in a second-level storage resource, comprising:

after obtaining the at least one target compression vector, initiating a data access request corresponding to the second-level storage resource, wherein the data access request is used to obtain at least one target original vector corresponding to the at least one target compression vector from the second-level storage resource; and obtaining a data access result corresponding to the data access request, wherein the data access result comprises the at least one target original vector, wherein the graph index is constructed by generating, for each original vector stored in the second-level storage resource, a corresponding node of the graph index, and storing, in the first-level storage resource, a compression vector associated with the original vector, wherein an edge in the graph index represents that a similarity relationship exists between original vectors corresponding to nodes connected to the edge, wherein the original vector is stored in the second-level storage resource, and wherein a data access delay of the internal memory is lower than a data access delay of the disk; and separately:

calculating, as a calculated similarity, a similarity between the query vector and the at least one target original vector;

sorting, as a sorted at least one target original vector, the at least one target original vector based on the calculated similarity; and determining, based on the sorted at least one target original vector, a vector retrieval result corresponding to the query vector.

11. The non-transitory, computer-readable medium of claim 10, wherein:

the graph index is constructed based on the original vector by:

dividing the original vector into at least one vector group, and determining an aggregation vector corresponding to each vector group, wherein original vectors comprised in each vector group are similar to each other; and the aggregation vector is an original vector in the original vectors comprised in the vector group;

constructing a node in the graph index based on the aggregation vector corresponding to each vector group, and associating a node used to represent each aggregation vector with a compression vector corresponding to each aggregation vector; and calculating a similarity between every two aggregation vectors in the aggregation vectors, and constructing an edge in the graph index based on the calculated similarity.

12. The non-transitory, computer-readable medium of claim 11, wherein dividing the original vector into at least one vector group, and determining an aggregation vector corresponding to each vector group, comprises:

dividing the original vector into at least one vector group; and after obtaining the at least one vector group through division:

selecting an original vector from original vectors comprised in each vector group as an aggregation vector corresponding to each vector group; or selecting at least one original vector from the original vector as an aggregation vector corresponding to the at least one vector group, and adding an original vector similar to each aggregation vector to a vector group corresponding to each aggregation vector.

13. The non-transitory, computer-readable medium of claim 11, wherein:

a similarity between the original vectors comprised in the vector group is not less than a predetermined first threshold; or a repetition quantity of original vectors whose similarity with each original vector comprised in the vector group is not less than a predetermined second threshold is not less than a predetermined third threshold.

14. The non-transitory, computer-readable medium of claim 11, wherein obtaining at least one target original vector corresponding to the at least one target compression vector from the second-level storage resource, comprises:

obtaining at least one target aggregation vector corresponding to the at least one target compression vector from the second-level storage resource; and obtaining an original vector comprised in a vector group to which each target aggregation vector belongs as the at least one target original vector corresponding to the at least one target compression vector.

15. The non-transitory, computer-readable medium of claim 10, wherein, after obtaining the at least one target compression vector, obtaining at least one target original vector corresponding to the at least one target compression vector from the second-level storage resource, comprises:

each time a target compression vector is obtained, initiating, as an initiated data access request, an asynchronous data access request corresponding to the second-level storage resource, wherein the asynchronous data access request is used to obtain a target original vector corresponding to the target compression vector from the second-level storage resource; and after obtaining the at least one target compression vector, obtaining a data access result corresponding to the initiated data access request, wherein the data access result comprises at least one target original vector corresponding to the at least one target compression vector.

16. The non-transitory, computer-readable medium of claim 10, wherein sorting the at least one target original vector based on the calculated similarity, and determining, based on the sorted at least one target original vector, a vector retrieval result corresponding to the query vector comprises:

sorting the at least one target original vector in descending order of calculated similarities, and determining, based on the sorted at least one target original vector, a predetermined quantity of top arranged target original vectors as the vector retrieval result corresponding to the query vector.

17. The non-transitory, computer-readable medium of claim 10, wherein the compression vector is a vector obtained after product quantization is performed on the original vector.

18. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

in response to a query vector:

obtaining, from an internal memory comprised in a first-level storage resource, at least one target compression vector having a highest similarity with the query vector based on a graph index, wherein the internal memory is directly accessible by a processor; and after obtaining the at least one target compression vector, obtaining at least one target original vector corresponding to the at least one target compression vector from a disk comprised in a second-level storage resource, comprising:

after obtaining the at least one target compression vector, initiating a data access request corresponding to the second-level storage resource, wherein the data access request is used to obtain at least one target original vector corresponding to the at least one target compression vector from the second-level storage resource; and obtaining a data access result corresponding to the data access request, wherein the data access result comprises the at least one target original vector, wherein the graph index is constructed by generating, for each original vector stored in the second-level storage resource, a corresponding node of the graph index, and storing, in the first-level storage resource, a compression vector associated with the original vector, wherein an edge in the graph index represents that a similarity relationship exists between original vectors corresponding to nodes connected to the edge, wherein the original vector is stored in the second-level storage resource, and wherein a data access delay of the internal memory is lower than a data access delay of the disk; and separately:

calculating, as a calculated similarity, a similarity between the query vector and the at least one target original vector;

sorting, as a sorted at least one target original vector, the at least one target original vector based on the calculated similarity; and determining, based on the sorted at least one target original vector, a vector retrieval result corresponding to the query vector.

* * * * *